United States Patent
Mori et al.

(10) Patent No.: US 6,181,309 B1
(45) Date of Patent: *Jan. 30, 2001

(54) COLOR LIQUID CRYSTAL DISPLAY DEVICE

(75) Inventors: Haruki Mori, Nishinomiya; Masao Ozeki, Yokohama, both of (JP)

(73) Assignee: Optrex Corporation, Tokyo (JP)

( * ) Notice: Under 35 U.S.C. 154(b), the term of this patent shall be extended for 0 days.

This patent is subject to a terminal disclaimer.

(21) Appl. No.: 09/065,729

(22) Filed: Apr. 24, 1998

(30) Foreign Application Priority Data

Apr. 25, 1997 (JP) .................................................. 9-109583

(51) Int. Cl.[7] .................................................. G09G 3/36
(52) U.S. Cl. .................................. 345/88; 345/89; 345/87; 349/118; 349/119
(58) Field of Search .................................. 345/88, 89, 87; 349/78, 117, 118, 119

(56) References Cited

U.S. PATENT DOCUMENTS

| | | | |
|---|---|---|---|
| 4,906,073 | * 3/1990 | Hunahata et al. | 349/117 |
| 5,194,975 | * 3/1993 | Akatsuka et al. | 349/119 |
| 5,519,523 | * 5/1996 | Madokoro et al. | 349/117 |
| 5,745,204 | * 4/1998 | Hoshino | 349/117 |
| 5,986,732 | * 11/1999 | Ozeki et al. | 349/118 |
| 5,990,991 | * 11/1999 | Tillin et al. | 349/78 |

* cited by examiner

Primary Examiner—Steven J. Saras
Assistant Examiner—Fritz Alphonse
(74) Attorney, Agent, or Firm—Oblon, Spivak, McClelland, Maier & Neustadt, P.C.

(57) ABSTRACT

A reflective type STN color liquid crystal display device having polarizers a liquid crystal layer a birefringent plate, an absorbing axis of upper polarizer, an absorbing axis of lower polarizer. Also include is the direction of a long axis of a liquid crystal molecule at an upper side of the liquid crystal layer, the direction of a long axis of a liquid crystal molecule at a lower side, a slow axis of birefringent plate, scanning electrodes of an N number, and data electrodes. Further $B_R \leq P_N - 2$ is satisfied when $P_N = N^{0.5} + 1$ and bias value $B_R = (V_r + V_c)/(V_c)$.

19 Claims, 6 Drawing Sheets

COLOR LIQUID CRYSTAL DISPLAY DEVICE

BACKGROUND OF THE INVENTION

1. Field of the Invention

The present invention relates to an improvement of a super-twisted nematic liquid crystal display. In particular, the present invention relates to a STN type color liquid crystal display device to effect multicolor development without using a color filter.

2. Discussion of Background

When a passive addressing type liquid crystal display device such as a twisted nematic liquid crystal display device (TN-LCD) or a super-twisted nematic liquid crystal display device (STN-LCD) is driven for effecting a display, driving voltages are applied between electrodes according to a line successive selection method wherein either of a row electrode or a column electrode is determined as a scanning electrode and the other is determined as a data electrode.

As a typical line successive selection method, APT (Alt-Pleshko Technique) or IAPT (Improved APT) has been known. This technique is desirable for a multiplex driving method because ON-OFF levels can easily be produced.

Further, in the line successive selection method, scanning signals are successively supplied to scanning electrodes; data signals are supplied to data electrodes, and potential differences between the scanning signals and the data signals are applied to pixels. In this case, some driving methods are employable so as not to cause a change of the effective voltage applied to a certain pixel due to another pixel which undergoes an ON display or an OFF display. One of the driving methods is called a voltage averaging method which is the basic method for driving an effective value responsive type liquid crystal display device.

Description will be made on the driving method for a liquid crystal display device with reference to FIG. 3. FIG. 3 shows a basic waveform used for driving a passive addressing type liquid crystal display device, which is an example of the line successive selection method using the voltage averaging method wherein a scanning signal voltage is expressed by $V_r$, a data signal voltage is expressed by $V_c$ and the number of scanning electrodes is expressed by N. In the sequence for driving pixel signals, there are a selection type and a non-selection time wherein a voltage applied to a pixel in the selection time is $(V_r+V_c)$ at the time of an ON display and the voltage is $(V_r-V_c)$ at the time of an OFF display.

In the liquid crystal display device, there appears a change of orientation of liquid crystal molecule depending on a voltage to be applied. Since the change of orientation causes an optical change, the voltage difference between an effective voltage in an ON display and an effective voltage in an OFF display should be large as possible. When the scanning signal voltage is expressed by $V_r$, the data signal voltage is expressed by $V_c$ and the number of scanning electrodes is expressed by N, the effective voltage in an ON display and the effective voltage in an OFF display can be expressed by the following Formulas 1A and 1B.

$$\text{Effective voltage in an ON display} = ((V_r+V_c)^2+(N-1) \times V_c^2)/N)^{0.5} \quad \text{Formula 1A}$$

$$\text{Effective voltage in an OFF display} = ((V_r-V_c)^2+(N-1) \times V_c^2)/N)^{0.5} \quad \text{Formula 1B}$$

The ratio of an effective voltage in an ON display part to an effective voltage in an OFF display part is called an ON-OFF ratio. Conventionally, when the passive addressing type liquid crystal display device is driven by the voltage averaging method, the ratio of the scanning signal voltage to the data signal voltage has been determined so as to increase the ON-OFF ratio.

$$\text{ON-OFF ratio} = ((a^2+2a+N)/(a^2-2a+N))^{0.5} \quad \text{Formula 2}$$

(where $a=V_r/V_c$, hereinbelow, $(a+1)$ is called a bias value $B_R$)

Accordingly, in order to maximize the ON-OFF ratio, the scanning signal voltage and the data signal voltage should be determined as shown in the following formula 3B. The bias value $B_R$ which can maximize the ON-OFF ratio is called the optimum bias value $B_{RMAX}$. Actually, the applied waveform (IAPT) as shown in FIG. 2 is used to lower the driving voltage.

$$a+1\sqrt{2} B_R \quad \text{Formula 3A}$$

$$B_{RMAX}=P_N \quad \text{Formula 3B}$$

If a liquid crystal display device for a monochrome display is used and the liquid crystal is completely responsive to the effective value, the contrast ratio can be increased by increasing the ON-OFF ratio. However, when a fast responsive type liquid crystal is used wherein the sum of response time at a rising time and a falling time is about 200 ms or less, there is a change of orientation in a short time and accordingly, the contrast ratio decreases. Such phenomenon is called a frame response.

The frame response phenomenon appears remarkably as the voltage difference of pixel signals between the selection time and the non-selection time is larger. Accordingly, it has been known to control the frame response by lowering a bias value from the optimum bias value. However, the lowering of the bias value from the optimum bias value results in the reduction of the ON-OFF ratio, which reduces the contrast ratio.

Further, it has been known to increase the frame frequency in order to control the frame response. However, this technique had a drawback to increase the power consumption rate. Further, it has been known to use a multiple line addressing method (MLA method) to control the frame response. However, this method requires driving ICs for exclusive use.

Further, there has been known a color liquid crystal display device utilizing the mutual interference of the birefringence in each of the liquid crystal layer and the birefringent plate. For example, Japanese Unexamined Patent Publication JP-A-8-292434 proposes a super-reflective color liquid crystal display device (hereinbelow, referred to as SRC-LCD including a transmission mode) in detail, which provides an achromatic (white) display in a state of the driving voltage being OFF; facilitates use of multiplex driving, and effects a multicolor display.

In order to provide a color display of three colors or more by the SRC-LCD, it is necessary to apply an intermediate voltage. In this case, it has been known that the color purity in employing the multiplex driving is decreased in comparison with a change of color to a change of voltage in a case of using a static driving method. This is a phenomenon different from the case caused by the reduction of the contrast ratio in a conventional monochrome display.

Further, the sum of response time at the rising and falling in a SRC mode was about 400 ms, and it was thought that the influence of the frame response due to a fast responsive property of the liquid crystal, which was often seen in the conventional monochrome display type STN-LCD, was small.

In order to drive a STN-LCD, the optimum bias is generally used because the highest ON-OFF ratio can be obtained. Generally, a monochrome STN-LCD is driven under such condition. The optimum bias is defined as ($N^{0.5}+1$). For instance, the optimum bias value in using 64 lines is 9. SRC-LCD (portable calculator) operable by such driving method has already been known. Further, there has been known SRC-LCD with 240 lines which provides a VGA display under the driving condition of a bias ratio of 16 (the optimum bias ratio=16.5).

In the following, a conventional technique in which the bias ratio is changed will be described.

Digest of technical papers for SID 1991 describes in P.747–P.750 that when a fast response type STN liquid crystal device is used for multiplex driving, the frame response is large and the bias value should be smaller than the optimum bias in order to increase the contrast ratio. Specifically, when a liquid crystal device having a liquid crystal layer gap of 5 μm, Δnd of 0.66 μm and a response time of 75 ms and when it is driven under conditions of a frame frequency of 70 Hz and a duty ratio of 1/200, the optimum bias ratio shows 1/15.14. However, the SID1991 describes that use of the optimum bias of about 1/10 is better in order to increase the contrast ratio. Thus, the prior art document proposes to reduce the bias value in order to prevent the reduction of the contrast ratio and so on in a case of using the fast response type liquid crystal.

On the other hand, the present invention is to prevent the color purity from deteriorating due to a strong influence by the frame response because Δnd of the liquid crystal layer is large. For this, the bias value is determined to be smaller. Such tendency is obtainable even when the response time of liquid crystal is long (The average response time (τON=τOFF) of the liquid crystal used for the present invention is about 200 ms).

SUMMARY OF THE INVENTION

It is an object of the present invention to provide a color liquid crystal display device which satisfies both requirements of an excellent color development in STN-LCD including SRC-LCD and a display provided by a multiplex driving for driving a large number of scanning electrodes.

It is another object of the present invention to provide a color liquid crystal display device which permits a display free from deterioration of the optical characteristics due to the frame response even when a super-twisted nematic liquid crystal is used. In particular, the present invention aims at improving the quality of a display in a color liquid crystal display device having scanning electrodes of about 32–120.

In accordance with the first aspect of the present invention, there is provided a color liquid crystal display device wherein a nematic liquid crystal layer having a positive dielectric anisotropy and including a chiral material is interposed between two substrates each having a transparent electrode and an alignment layer which are formed in substantially parallel; the twist angle of the liquid crystal layer, formed by the alignment layers is 160°–300°; a pair of polarizers are disposed outside the liquid crystal layer; a birefringent plate is disposed at least one side of the liquid crystal layer; and a driving circuit is provided to apply a driving voltage across the transparent electrodes, the color liquid crystal display device being characterized in that the product $\Delta n_1 \cdot d_1$ of the refractive index anisotropy of liquid crystal of the liquid crystal layer and the thickness $d_1$ of the liquid crystal layer is 1.2–2.5 μm; the birefringent plate has a slow axis and a fast axis; the sum of the product $\Delta n_2 d_2$ of the refractive index anisotropy of the slow axis and the fast axis and the thickness in the vertical direction is 1.2–2.5μm; when in a multiplex driving using a voltage averaging method, N represents the number of scanning electrodes, $P_N = N^{0.5}+1$ and, $B_R=(V_r+V_c)/(V_c)$, the ratio $(V_r+V_c)/(V_c)$ of the magnitude $(V_r+V_c)$ of a voltage in a selection time to the magnitude $(V_c)$ of a voltage in a non-selection time in a time that a pixel signal produced by a scanning signal and a data signal is in an ON display, $B_R \leq P_N-2$ is satisfied; and a voltage value of 3 or more is selected.

The structure of SRC-LCD is described in, for instance, WO96/23244 (U.S. Ser. No. 08/704770). The present invention includes the described structure.

In accordance with the second aspect of the present invention, there is provided the color liquid crystal display device according to the first aspect wherein the number N of scanning electrodes is 32–120 and $P_N-5 \leq B_R \leq P_N-2$ is satisfied.

Further, in accordance with the third aspect of the present invention, there is provided the color liquid crystal display device according to the first or second aspect, wherein the number N of scanning electrodes is 50–63 and $P_N-5 \leq B_R \leq P_N-4$ is satisfied.

Further, in accordance with the fourth aspect of the present invention, there is provided the color liquid crystal display device according to any one of the first to third aspects, wherein the number N of scanning electrodes is 63–80 and $P_N-5 \leq B_R \leq P_N-4$ is satisfied.

Further, in accordance with the fifth aspect of the present invention, there is provided the color liquid crystal display device according to any one of the first to fourth aspects, wherein the twist angle of the liquid crystal layer is 230°–250° and $\Delta n_1 \cdot d_1$ and $\Delta n_2 \cdot d_2$ used are in the relation of $\Delta n_1 \cdot d_1 * 1.05 \leq \Delta n_2 \cdot d_2 \leq \Delta n_1 \cdot d_1 * 1.15$.

Further, in accordance with the sixth aspect of the present invention, there is provided the color liquid crystal display device according to any one of the first to fifth aspects, wherein the twist angle is 230°–250°; $\Delta n_1 \cdot d$ is 1.2–1.3 μm; $\Delta n_2 \cdot d_2$ is 1.3–1.5 μm; the angle $\theta_2$ formed between the slow axis and the orientation direction of a liquid crystal molecule at a first substrate side is 70–90°; the angle $\theta_1$ formed between the polarizing axis or the absorbing axis of the polarizer at the first substrate side and the orientation direction is 115–135°; and the angle $\theta_3$ formed between the polarizing axis or the absorbing axis of the polarizer at a second substrate side and the orientation direction of the liquid crystal molecule at the second substrate side is 130–150°.

Further, in accordance with the seventh aspect, there is provided the color liquid crystal display device according to the first aspect, wherein the sum of the response time at a rising time and a falling time in the liquid crystal is 350–500 ms.

Further, in accordance with the eighth aspect, there is provided the color liquid crystal display device according to the first aspect, wherein the frame frequency is 140 Hz or less.

Further, in accordance with the ninth aspect, there is provided the color liquid crystal display device according to the eighth aspect, wherein the frame frequency is 50–90 Hz. The ninth aspect of the present invention is preferable because the flicker is not conspicuous.

Further, in accordance with the tenth aspect, there is provided the color liquid crystal display device according to the first aspect, wherein gradations are provided by using a frame controlling method and a pulse width modulation method. For instance, 29 gradations are produced in combination of 4 frames and 9-divided PWM and 4 gradations are selected from the above to use them for a color display of SRC-LCD. With respect to gradation driving for SRC-LCD, the technique described in, for example, WO97/35225 (U.S. Ser. No. 08/945758) can be used.

Further, in accordance with the eleventh aspect, there is provided the color liquid crystal display device according to the first aspect, wherein the thickness of the substrate is 0.4 mm or less.

Further, in accordance with the twelfth aspect, there is provided the color liquid crystal display device according to the first aspect, which is usable for a display for a potable information terminal.

Further, in accordance with the thirteenth aspect, there is provided the color liquid crystal display device according to the first aspect, which is combined with an integrated circuit comprising a gradation controller and a driver circuit as a one-piece body.

In any of the above-mentioned color liquid crystal display devices, the birefringent plate may be disposed at a single side or both sides of the liquid crystal layer. Further, the number of the birefringent plate may be single or plural as far as a desired color development can be obtained by the interaction between the birefringent plate or plates and the liquid crystal layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The color liquid crystal display device of the present invention will be described in more detail.

In a case of SRC-LCD in which birefringence is directly utilized to effect color development without using any color filter, the purity of color provided by a multiplex driving is decreased in comparison with the purity of color developed by a static driving. The cause of the phenomenon can be considered as follows.

In SRC-LCD, $\Delta n_1 \cdot d_1$ of the liquid crystal is 1.2 μm or more, which is determined to be greater than a value of about 0.8 μm in a conventional monochrome display. When a desired value of $\Delta n \cdot d$ is to be obtained, either $\Delta n$ or the gap d is increased. However, when $\Delta n$ of the liquid crystal is increased, the response speed becomes slow because the viscosity of material for the liquid crystal is generally increased.

On the other hand, when the gap is increased, the response speed becomes slow in proportion to the square of the dimension of the gap. Thus, the sum of the response time at a rising time and a falling time in SRC-LCD becomes longer than the response time of the ordinary monochrome display. At present, the sum of the response time of SRC-LCD is about 400–500 ms.

Accordingly, it can not be considered that the frame response in using a quick response type liquid crystal occurs in the same manner as seen in a conventional monochrome display type STN-LCD. The inventor of this application consider the above-mentioned phenomenon as follows.

In SRC-LCD, $\Delta n_1 \cdot d_1$ of the liquid crystal used is 1.2 or more. Even though the rate of change of the liquid crystal due to the frame response is the same, $\Delta n_1 d_1$ in SRC-LCD is large, and accordingly, it is supposed that the optical change is relatively large. Although any problem has not been caused on the frame response in the conventional monochrome display type STN-LCD, there results a big problem in SRC-LCD. Unlike the conventional monochrome display, the optical change due to the frame response is observed as mixed colors in SRC-LCD. Namely, the reduction of color purity is caused by the frame response.

In the present invention, it is essential that the bias value is determined to be at least 2 points lower than the optimum value. With such determination, the effect of suppressing the frame response is reduced. Further, when the bias value is reduced too much, the ON-OFF ratio is decreased whereby color development becomes insufficient and there is an adverse effect. Accordingly, the condition as specified in the following Formula 4 should be satisfied.

$$P_N 5 \leq B_R \leq P_N - 2 \qquad \text{Formula 4}$$

Figure 1:
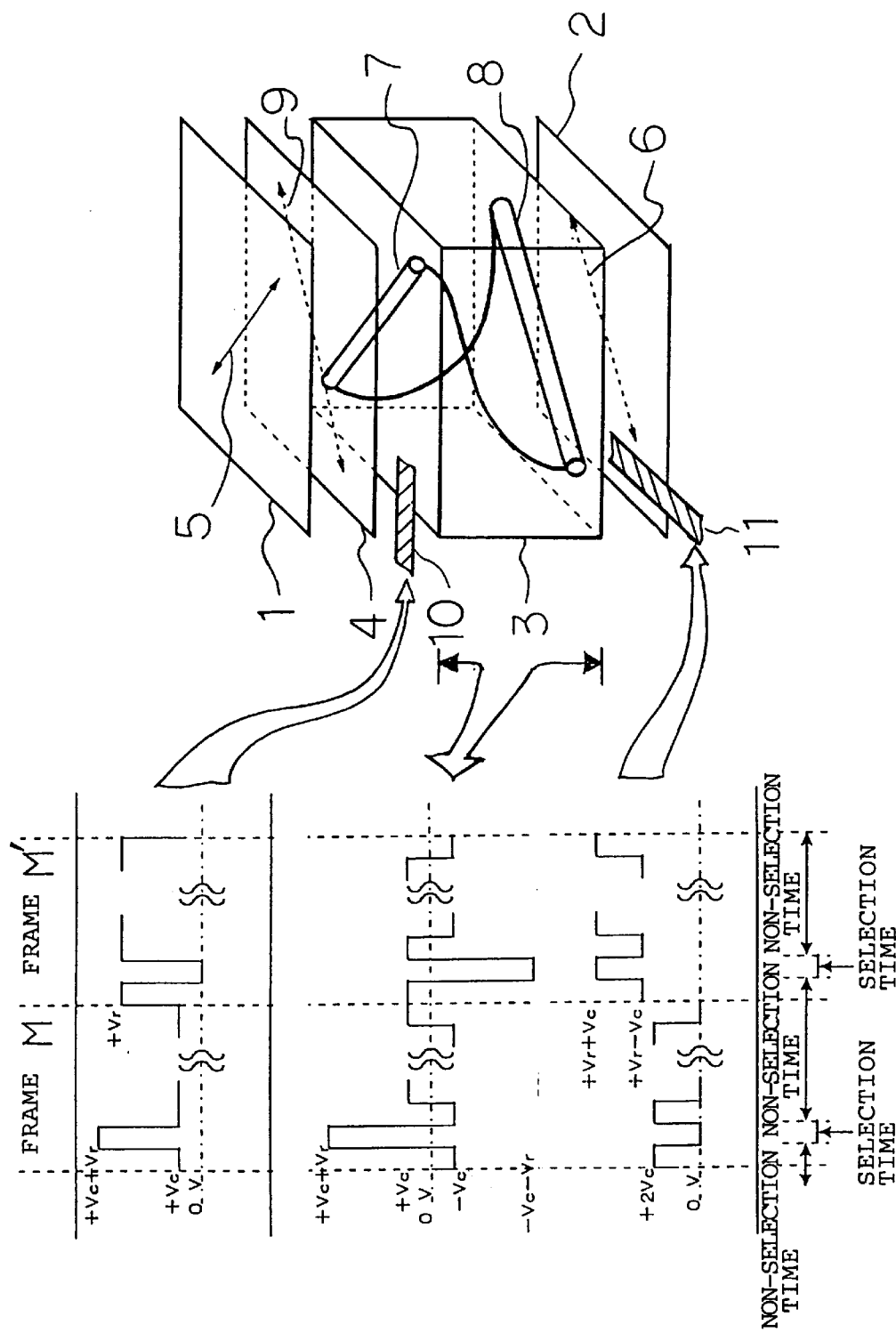
FIG. 1 is a diagram showing an embodiment of the cell structure according to the present invention.
Figure 2:
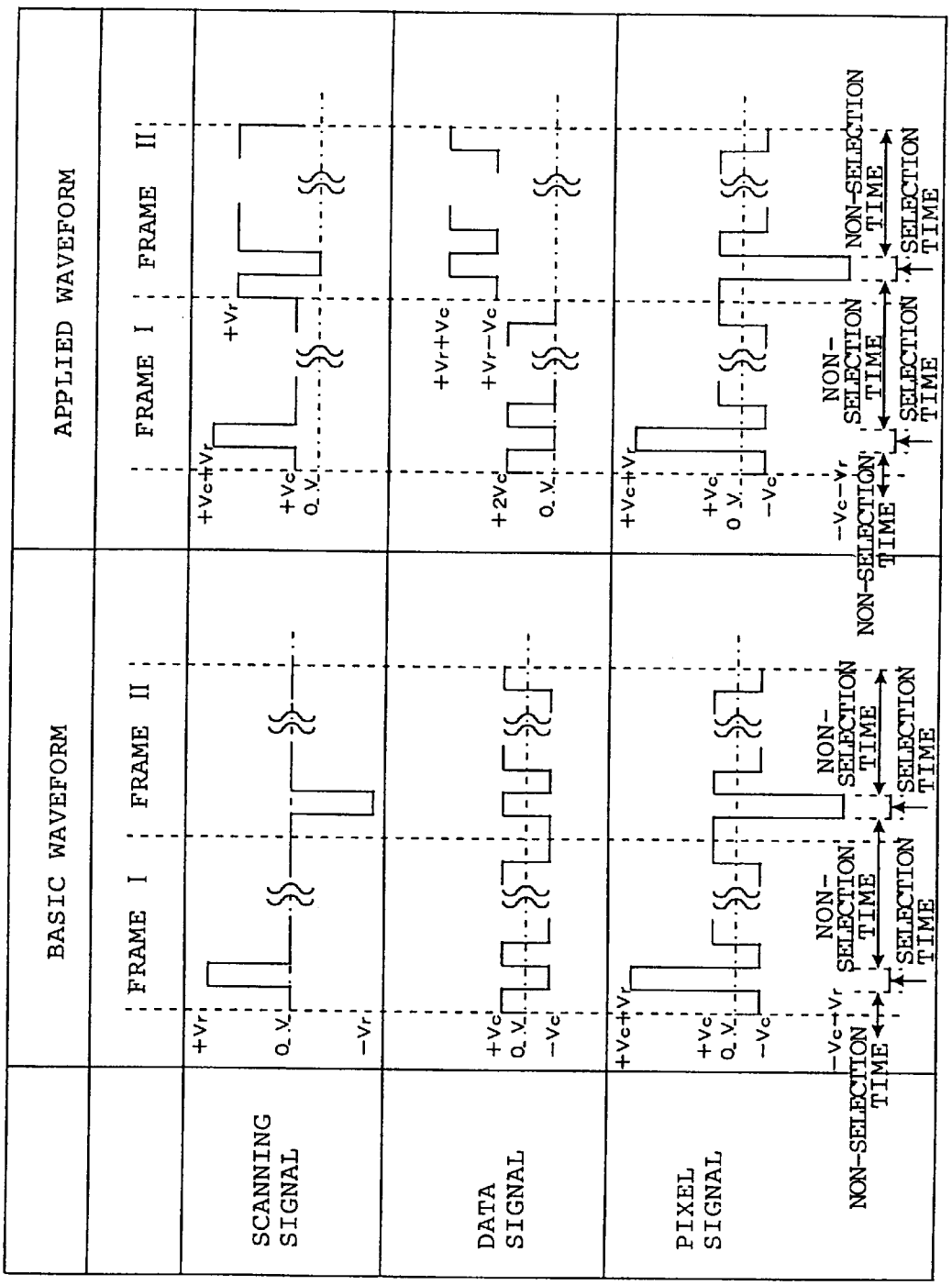
FIG. 2 is a diagram showing multiplex waveforms.
Figure 3:
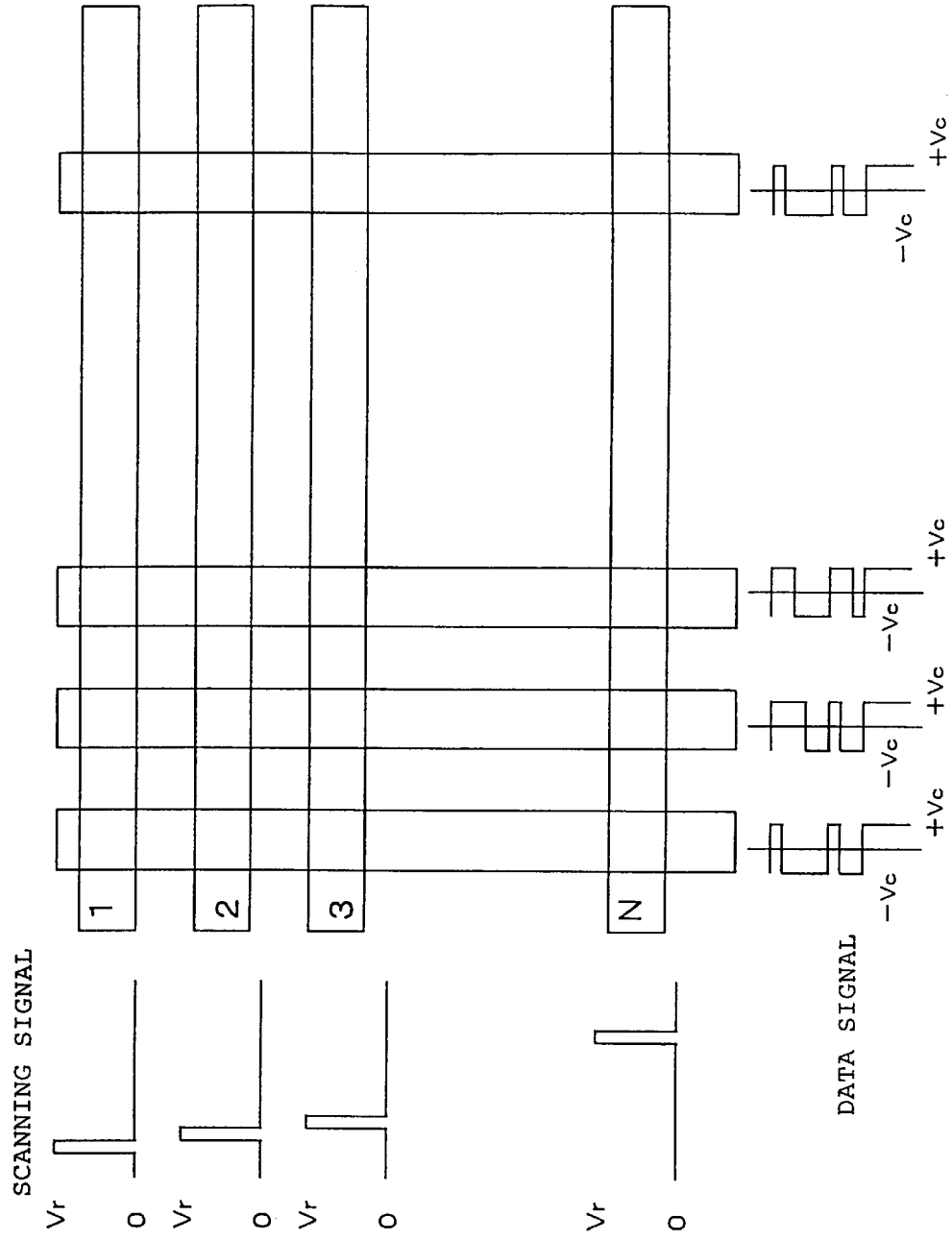
FIG. 3 is a diagram showing multiplex waveforms in a line successive selection system using a voltage averaging method wherein Vr represents a scanning signal voltage, $V_c$ represents a display signal voltage and N represents a scanning electrode number.

FIG. 1 shows the construction of an embodiment of the color liquid crystal display device of the present invention wherein reference numerals 1, 2 designate a pair of polarizers, numeral 3 designates a liquid crystal layer comprising a nematic liquid crystal having a positive dielectric anisotropy wherein $\Delta n_1 \cdot d_1$ is 1.2–2.5 μm and a twist angle of 160–300°, numeral 4 designates a birefringent plate having $\Delta n_2 \cdot d_2$, which is disposed on the liquid crystal layer, numeral 5 designates the absorbing axis of an upper polarizer, numeral 6 designates the absorbing axis of a lower polarizer, numeral 7 designates the direction of a long axis (one of orientation directions) of a liquid crystal molecule at an upper side of the liquid crystal layer, numeral 8 designates the direction of a long axis (the other of the orientation direction) of a liquid crystal molecule at a lower side of the liquid crystal layer, and numeral 9 designates an axial direction (a slow axis) of the laminated birefringent plate.

Figure 4:
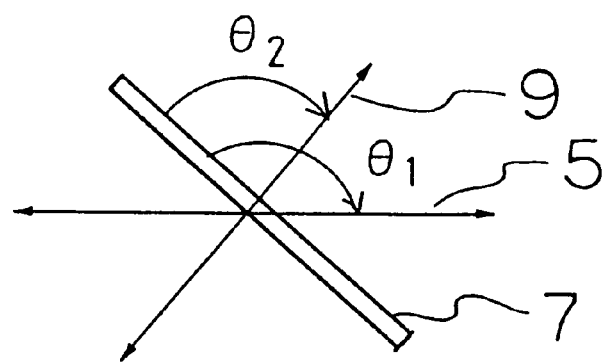
FIG. 4 is a diagram showing a relation of angle of structural elements at the upper side of the cell structure in the first embodiment.
Figure 5:
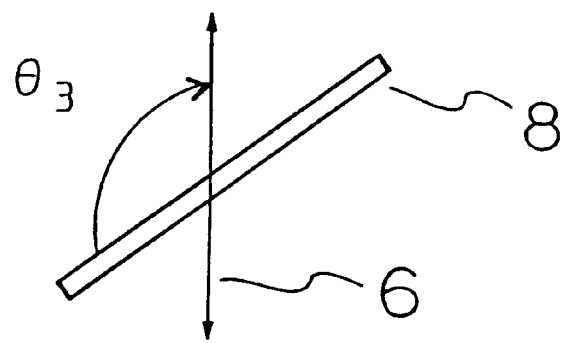
FIG. 5 is a diagram showing a relation of angle of the structural elements at a lower side of the cell structure in the first embodiment.

In FIGS. 4 and 5, $\theta_1$ represents an angle obtained by measuring clockwise the direction of the absorbing axis 5 of the upper polarizer with respect to the direction of the long axis of the liquid crystal molecule 7 at the upper side of the liquid crystal layer, $\theta_2$ represents an angle obtained by measuring clockwise the axial direction (slow axis) 9 of the upper birefringent plate 4 with respect to the direction of the long axis of the liquid crystal molecule at the upper side of the liquid crystal layer, and $\theta_3$ represents an angle obtained by measuring clockwise the direction of the absorbing axis 6 of the lower polarizer with respect to the direction of the long axis of the liquid crystal molecule 8 at the lower side of the liquid crystal layer.

The present invention provides the optimized combination of the angles $\theta_1$, $\theta_2$ and $\theta_3$, $\Delta n_1 \cdot d_1$ of the liquid crystal layer, the twist angle of the liquid crystal layer, $\Delta n_2 \cdot d_2$ of the birefringent plate and driving conditions whereby an excellent color purity can be provided even under multiplex driving conditions.

In the above-mentioned description, an example using a liquid crystal layer having a left helical structure is described. However, even by using a liquid crystal layer having the opposite helical structure, a desired color display can easily be obtained in the same manner as the liquid crystal layer of the left helical structure by changing the r-elations of angles $\theta_1$, $\theta_2$ and $\theta_3$ among the directions of the long axis of the liquid crystal molecules in the liquid crystal layer, the directions of the polarizing axis of the polarizers and the direction of the slow axis of the birefringent plate to a counter clockwise direction.

Now, the present invention will be described in detail with reference to Examples. However, it should be understood that the present invention is by no means restricted by such specific Examples.

EXAMPLE 1

A liquid crystal cell was prepared in the manner as follows. An ITO transparent electrode was formed on each glass substrate by patterning in a stripe form; an insulating film was formed on the electrode and an overcoat layer of polyimide was formed on the insulating film, followed by rubbing to form an orientation controlling film. Thus, each substrate was prepared. Two substrates were overlaid and a sealing material was applied to the periphery of the overlaid substrates to form a liquid crystal cell. A nematic liquid crystal having a positive dielectric anisotropy was filled in the liquid crystal cell, and the injection hole is closed with a sealing material.

The refractive index anisotropy $\Delta n_1$ of the liquid crystal and the thickness $d_1$ of the liquid crystal layer were so adjusted that $\Delta n_1 \cdot d_1$ of the liquid crystal layer was 1.27 $\mu$m. Further, determination was so made that $\Delta n_2 \cdot d_2$ of the birefringent plate was 1.40 $\mu$m, the twist angle of the liquid crystal layer was 240°, $\theta_1$=125°, $\theta_2$=80° and $\theta_3$=140°.

The physical value of the liquid crystal $\Delta n$=0.196 (25° C.), Tc=99° C., the dielectric anisotropy=15 (25° C.), the viscosity=24 cSt (20°C.) were respectively determined. The thickness of the glass substrate used was 0.4 mm. The liquid crystal cell having the same arrangement as shown in FIG. 1 was formed, and measurement of a color display on the color liquid crystal cell was conducted by changing the bias value.

Figure 6:
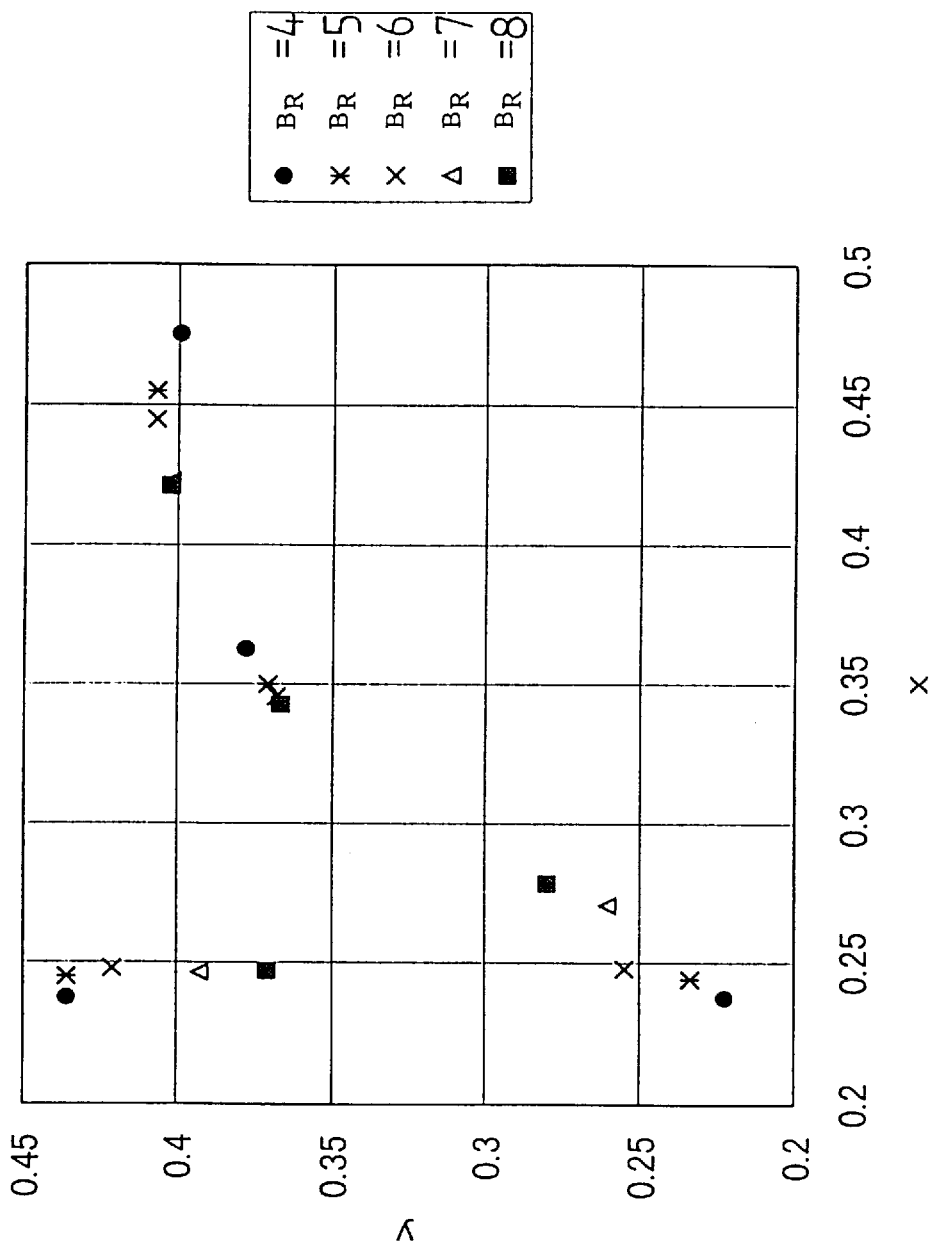
FIG. 6 is a chromaticity diagram showing bias values at a duty of 1/65.

Table 1 shows a result obtained by driving the device to effect a four gradation display by using a 1/65 duty wherein 4 levels of gradation were 0%, 41%, 65% and 100%. Each of the gradation levels corresponds to color development of white, orange, blue and green. FIG. 6 is a chromaticity diagram obtained by measuring with bias values of 8, 7, 6, 5 and 4.

Figure 7:
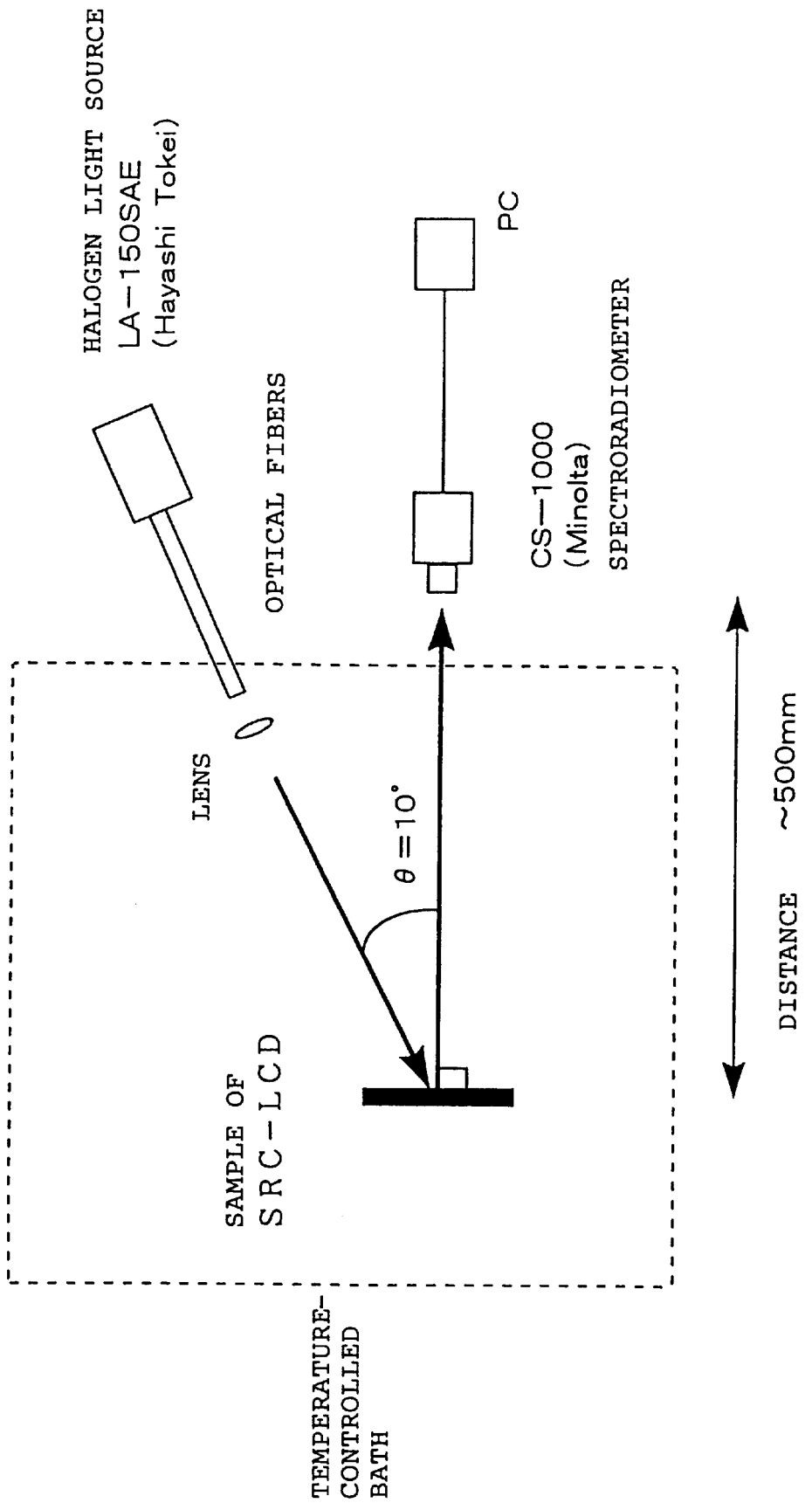
FIG. 7 is a block diagram showing a measuring system for measuring the display characteristics of SRC-LCD.

The measurement was conducted by using the measuring system as shown in FIG. 7. In the measurement, light having a high directivity is introduced to a sample of SRC-LCD at an inclination angle of 10°, and the reflected light was measured from a vertical direction to the sample.

Evaluation was so made that the light was standardized with a standard white board so as to cancel the color of a light source, i.e., the light was treated as being emitted from a C-light source.

A halogen bulb (LA-150SAE, manufactured by Hayashi Watch Co., Ltd.) was used as the light source. Light from the light source was introduced by means of optical fibers so as to irradiate through a lens an optical beam to SRC-LCD. The light beam was modulated in SRC-LCD to develop each color. The reflected light of each of the developed colors was measured with a spectroradiometer (CS-1000, Minolta Camera Co., Ltd.). Data obtained by the measurement were operated by using a personal computer. The distance between SRC-LCD and the spectroradiometer (light incident point) was determined to be about 500 mm.

In Table 1, chromaticity coordinates of white, orange, blue and green obtained by applying various bias ratios are shown. The color purity of an orange color, a blue color or a green color becomes better as the bias value is made smaller. Namely, a bias value of 4 is the best. It is understood, however, that the color development of white is shifted to an yellow side when bias value is 4. Accordingly, a bias value of 5 is better in order to obtain well-balanced color development of white, orange, blue and green.

Optimized bias value at a 1/65 duty is about 9. It is understood that the bias value which provides the optimum balance in color purity at 1/65 duty in this Example is 5, which is smaller than the above-mentioned optimum bias of 4. As shown in FIG. 6 and Table 1, it was possible to provide a display having a higher color purity as the bias value becomes lower concerning the colors except for white.

TABLE 1

| | 1/65 duty | | |
|---|---|---|---|
| Bias ratio | Color | x | y |
| 8 | White | 0.342479 | 0.366779 |
| | Orange | 0.421702 | 0.402435 |
| | Blue | 0.278966 | 0.280078 |
| | Green | 0.247624 | 0.371045 |
| 7 | White | 0.342869 | 0.366873 |
| | Orange | 0.423095 | 0.402309 |
| | Blue | 0.27074 | 0.259881 |
| | Green | 0.246722 | 0.392663 |
| 6 | White | 0.345789 | 0.368281 |
| | Orange | 0.444348 | 0.407276 |
| | Blue | 0.247701 | 0.254487 |
| | Green | 0.247927 | 0.421373 |
| 5 | White | 0.350208 | 0.370679 |
| | Orange | 0.454991 | 0.407604 |
| | Blue | 0.244148 | 0.233556 |
| | Green | 0.244796 | 0.435968 |
| 4 | White | 0.363429 | 0.377982 |
| | Orange | 0.475296 | 0.399701 |
| | Blue | 0.237542 | 0.222416 |
| | Green | 0.237573 | 0.436264 |

EXAMPLE 2

A liquid crystal cell was prepared in the same manner as Example 1. Driving for a four gradation display was conducted by a 1/55 duty wherein the levels of gradation were 0%, 41%, 65% and 100%. The levels of gradation correspond to the development of colors of white, orange, blue and green. Generally, the optimum bias value at a 1/55 duty is about 8.5. In this Example, however, the bias value which provided the optimum balance of color purity was 5, which was 3.5 lower than the optimum bias value.

In accordance with the present invention, when a color liquid crystal display device utilizing birefringence, such as SRC-LCD is subjected to multiplex driving, it has been found that the reduction of color purity caused by the occurrence of mixed colors can be prevented.

Further, since the scanning signal voltage could be lowered by lowering the bias value, dielectric strength of a driver circuit could be reduced. Further, the lowering of the scanning signal voltage was advantageous in saving the consumption of power. Further, it has been found that use of a portable information terminal wherein a usable temperature is high or use of liquid crystal of low viscosity is in particular effective since the frame response is remarkable when there is a large change of the orientation of the liquid crystal molecules.

As described above, the color liquid crystal display device of the present invention provides an excellent effect such as a low power consumption rate, and is effective when it is used in a high temperature region. Accordingly, when the color liquid crystal display device of the present invention is used for a portable electronic device such as a portable telephone, an electronic note, an electronic book, an electronic dictionary, a PDA (a portable data accessing terminal), a pager (a pocket bell), which are all for outdoor use, it provides a high visibility due to its excellent characteristics of display. The present invention can be applied to various purposes of use as far as the effect of the present invention is not reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A color liquid crystal display device, comprising:
   a nematic liquid crystal layer having a positive dielectric anisotropy and including a chiral material interposed between two substrates each having a transparent electrode and an alignment layer formed in substantially parallel;
   a twist angle of the liquid crystal layer, formed by the alignment layer is 160°–300°;
   a pair of polarizers disposed outside the liquid crystal layer;
   a birefringent plate disposed at at least one side of the liquid crystal layer; and
   a driving circuit configured to apply a driving voltage across the transparent electrodes,
   wherein:
      a product $\Delta n_1 \cdot d_1$ of a refractive index anisotropy of liquid crystal of the liquid crystal layer and a thickness $d_1$ of the liquid crystal layer is 1.2–2.5 $\mu$m;
      the birefringent plate has a slow axis and a fast axis;
      a sum of a product $\Delta n_2 \cdot d_2$ of the refractive index anisotropy of the slow axis and the fast axis and a thickness in a vertical direction is 1.2–2.5 $\mu$m;
      when in a multiplex driving using a voltage averaging method, N represents a number of scanning electrodes, $P_N = N^{0.5} + 1$ and $B_R = (V_r + V_c)/(V_c)$, a ratio $(V_r + V_c)/(V_c)$ of a magnitude $(V_r + V_c)$ of a voltage in a selection time to a magnitude $(V_c)$ of a voltage in a non-selection time in a time that a pixel signal produced by a scanning signal and a data signal is in an ON display, $B_R \leq P_N - 2$ is satisfied; and
      a voltage value of 3 or more is selected.

2. The color liquid crystal display device according to claim 1, wherein the number N of scanning electrodes is 32–120 and $P_N - 5 \leq B_R \leq P_N - 2$ is satisfied.

3. The color liquid crystal display device according to claim 1, wherein the number N of scanning electrodes is 50–63 and $P_N - 4 \leq B_R \leq P_N - 3$ is satisfied.

4. The color liquid crystal display device according to claim 1, wherein the number N of scanning electrodes is 63–80 and $P_N - 5 \leq B_R \leq P_N - 4$ is satisfied.

5. The color liquid crystal display device according to claim 1, wherein the twist angle of the liquid crystal layer is 230°–250° and $\Delta n_1 \cdot d_1$ and $\Delta n_2 \cdot d_2$ used are in the relation of $\Delta n_1 \cdot d_1 * 1.05 \leq \Delta n_2 \cdot d_2 \leq \Delta n_1 \cdot d_1 * 1.15$.

6. The color liquid crystal display device according to claim 2, wherein the twist angle of the liquid crystal layer is 230°–250° and $\Delta n_1 \cdot_{d1}$ and $\Delta n_2 \cdot d_2$ used are in the relation of $\Delta n_1 \cdot d_1 * 1.05 \leq \Delta n_2 \cdot d_2 \leq \Delta n_1 \cdot d_1 * 1.15$.

7. The color liquid crystal display device according to claim 3, wherein the twist angle of the liquid crystal layer is 230°–250° and $\Delta n_1 \cdot d_1$ and $\Delta n_2 \cdot d_2$ used are in the relation of $\Delta n_1 \cdot d_1 * 1.05 \leq \Delta_2 \cdot d_2 \leq \Delta n_1 \cdot d_1 * 1.15$.

8. The color liquid crystal display device according to claim 4, wherein the twist angle of the liquid crystal layer is 230°–250° and $\Delta n_1 \cdot d_1$ and $\Delta n_2 \cdot d_2$ used are in the relation of $\Delta n_1 \cdot d_1 * 1.05 \leq \Delta n_2 \cdot d_2 \leq \Delta n_1 \cdot d_1 * 1.15$.

9. The color liquid crystal display device according to claim 1, wherein the twist angle is 230°–250°; $\Delta n_1 \cdot d_1$ is 1.2–1.3 $\mu$m; $\Delta n_2 \cdot d_2$ is 1.3–1.5 $\mu$m; the angle $\theta_2$ formed between the slow axis and the orientation direction of a liquid crystal molecule at a first substrate side is 70–90°; the angle $\theta_1$ formed between the polarizing axis or the absorbing axis of the polarizer at the first substrate side and the orientation direction is 115–135°; and the angle $\theta_3$ formed between the polarizing axis or the absorbing axis of the polarizer at a second substrate side and the orientation direction of the liquid crystal molecule at the second substrate side is 130–150°.

10. The color liquid crystal display device according to claim 2, wherein the twist angle is 230–250°; $\Delta n_1 \cdot d_1$ is 1.2–1.3 $\mu$m; $\Delta n_2 \cdot d_2$ is 1.3–1.5 $\mu$m; the angle $\theta_2$ formed between the slow axis and the orientation direction of a liquid crystal molecule at a first substrate side is 709–90° the angle $\theta_1$ formed between the polarizing axis or the absorbing axis of the polarizer at the first substrate side and the orientation direction is 115–135°; and the angle $\theta_3$ formed between the polarizing axis or the absorbing axis of the polarizer at a second substrate side and the orientation direction of the liquid crystal molecule at the second substrate side is 130–150°.

11. The color liquid crystal display device according to claim 3, wherein the twist angle is 230–250°; $\Delta n_1 \cdot d_1$ is 1.2–1.3 $\mu$m; $\Delta n_2 \cdot d_2$ is 1.3–1.5 $\mu$m; the angle $\theta_2$ formed between the slow axis and the orientation direction of a liquid crystal molecule at a first substrate side is 70–90°; the angle $\theta_1$ formed between the polarizing axis or the absorbing axis of the polarizer at the first substrate side and the orientation direction is 115–135°; and the angle $\theta_3$ formed between the polarizing axis or the absorbing axis of the polarizer at a second substrate side and the orientation direction of the liquid crystal molecule at the second substrate side is 130–150°.

12. The color liquid crystal display device according to claim 4, wherein the twist angle is 230–250°; $\Delta n_1 \cdot d_1$ is 1.2–1.3 $\mu$m; $\Delta n_2 \cdot d_2$ is 1.3–1.5 $\mu$m; the angle $\theta_2$ formed between the slow axis and the orientation direction of a liquid crystal molecule at a first substrate side is 70–90°; the angle $\theta_1$ formed between the polarizing axis or the absorbing axis of the polarizer at the first substrate side and the orientation direction is 115–135°; and the angle $\theta_3$ formed between the polarizing axis or the absorbing axis of the polarizer at a second substrate side and the orientation direction of the liquid crystal molecule at the second substrate side is 130–150°.

13. The color liquid crystal display device according to claim 1, wherein the sum of the response time at a rising time and a falling time in the liquid crystal is 350–500 ms.

14. The color liquid crystal display device according to claim 1, wherein the frame frequency is 140 Hz or less.

15. The color liquid crystal display device according to claim 14, wherein the frame frequency is 50–90 Hz.

16. The color liquid crystal display device according to claim 1, wherein gradations are provided by using a frame rate controlling method and a pulse width modulation method.

17. The color liquid crystal display device according to claim 1, wherein the thickness of the substrate is 0.4 mm or less.

18. The color liquid crystal display device according to claim 1, which is usable for a display for a portable information terminal.

19. The color liquid crystal display device according to claim 1, which is combined with an integrated circuit comprising a gradation controller and a driver circuit as a one-piece body.

* * * * *